US012105696B2

(12) United States Patent
Li et al.

(10) Patent No.: US 12,105,696 B2
(45) Date of Patent: *Oct. 1, 2024

(54) DYNAMIC INDEX MANAGEMENT FOR COMPUTING STORAGE RESOURCES

(71) Applicant: International Business Machines Corporation, Armonk, NY (US)

(72) Inventors: Shuo Li, Beijing (CN); Xiaobo Wang, Beijing (CN); Shengyan Sun, Beijing (CN); Jia Tian Zhong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/188,211

(22) Filed: Mar. 22, 2023

(65) Prior Publication Data

US 2023/0229580 A1 Jul. 20, 2023

Related U.S. Application Data

(63) Continuation of application No. 16/689,668, filed on Nov. 20, 2019, now Pat. No. 11,636,081.

(51) Int. Cl.
*G06F 16/22* (2019.01)
*G06F 11/34* (2006.01)
*G06N 5/04* (2023.01)
*G06N 20/00* (2019.01)

(52) U.S. Cl.
CPC ...... *G06F 16/2282* (2019.01); *G06F 11/3409* (2013.01); *G06F 11/3452* (2013.01); *G06N 5/04* (2013.01); *G06N 20/00* (2019.01)

(58) Field of Classification Search
CPC ............ G06F 16/24542; G06F 16/901
USPC ............................................. 707/706
See application file for complete search history.

(56) References Cited

U.S. PATENT DOCUMENTS

| 5,551,027 | A | 8/1996 | Choy et al. |
| 5,765,154 | A | 6/1998 | Horikiri et al. |
| 8,489,565 | B2 | 7/2013 | Balasubramanian et al. |
| 9,507,887 | B1 * | 11/2016 | Wang ............... G06F 3/0685 |
| 10,936,559 | B1 * | 3/2021 | Jones ............. G06F 16/24562 |
| 11,636,081 | B2 | 4/2023 | Li |
| 2010/0281013 | A1 | 11/2010 | Graefe |

(Continued)

OTHER PUBLICATIONS

IBM Appendix P., "List of IBM Patents or Patent Applications to be Treated as Related", Dated Herewith, 2 pages.

(Continued)

*Primary Examiner* — Hung T Vy
(74) *Attorney, Agent, or Firm* — David K. Mattheis

(57) ABSTRACT

Methods that provide dynamic index management for a set of computing storage resources are disclosed herein. One method includes collecting, by a processor, a set of current performance data for a set of storage resources storing data and implementing a set of indexes for the data stored on the set of storage resources based on an optimized performance predicted for the set of storage resources based on the collected set of current performance data and a set of predicted performance data that identifies the set of indexes. Also disclosed herein are apparatus, systems, and computer program products that can include, perform, and/or implement the methods for providing dynamic index management for a set of computing storage resources.

20 Claims, 15 Drawing Sheets

(56) References Cited

U.S. PATENT DOCUMENTS

2012/0029961 A1* 2/2012 Aspernas ......... G06Q 10/06311
  705/7.13
2012/0030355 A1 2/2012 Iyer et al.
2012/0323929 A1 12/2012 Kimura et al.

OTHER PUBLICATIONS

Anonymous, "Index on Demand", IP.com prior art database technical disclosure, IP.com No. IPCOM000250158D, Jun. 7, 2017, pp. 1-8.

* cited by examiner

Maintain Primary Index

Replace Primary Index

No Index Update

All Indexes Updated

Partial Indexes Update

Update Primary Index

DYNAMIC INDEX MANAGEMENT FOR COMPUTING STORAGE RESOURCES

REFERENCE TO RELATED APPLICATIONS

This application is a Continuation of and claims priority to U.S. patent application Ser. No. 16/689,668, filed on Nov. 20, 2019, the content of which is incorporated herein in its entirety.

FIELD

The subject matter disclosed herein relates to data storage and, more particularly, relates to dynamic index management for computing storage resources.

BACKGROUND

Contemporary storage resources for a computing system can utilize one or more different types of indexes for locating data stored therein. The index(es) are typically selected to fit a particular computing environment because different types of indexes can provide different performance features and/or storage usage. However, a storage resource and/or the data stored therein often changes over time and/or with use, which can result in the index(es) becoming outdated and/or inefficient for use in the current computing environment.

BRIEF SUMMARY

Apparatus and systems that provide dynamic index management for a set of computing storage resources are disclosed herein. One apparatus and/or system includes an information module that collects a set of current performance data for a set of storage resources storing data and an index module that implements a set of indexes for the data stored on the set of storage resources based on an optimized performance predicted for the set of storage resources based on the collected set of current performance data and a set of predicted performance data that identifies the set of indexes. In additional or alternative embodiments, at least a portion of the modules includes a set of hardware circuits, a set of programmable hardware devices, and/or executable code stored on a set of non-transitory computer-readable storage media.

Methods that provide dynamic index management for a set of computing storage resources are also provided. One method includes collecting, by a processor, a set of current performance data for a set of storage resources storing data and implementing a set of indexes for the data stored on the set of storage resources based on an optimized performance predicted for the set of storage resources based on the collected set of current performance data and a set of predicted performance data that identifies the set of indexes.

Also disclosed herein are computer program products including a computer-readable storage medium including program instructions embodied therewith that can provide dynamic index management for a set of computing storage resources. The program instructions are executable by a processor and cause the processor to collect a set of current performance data for a set of storage resources storing data and implement a set of indexes for the data stored on the set of storage resources based on an optimized performance predicted for the set of storage resources based on the collected set of current performance data and a set of predicted performance data that identifies the set of indexes.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which.

DETAILED DESCRIPTION

Figure 1:
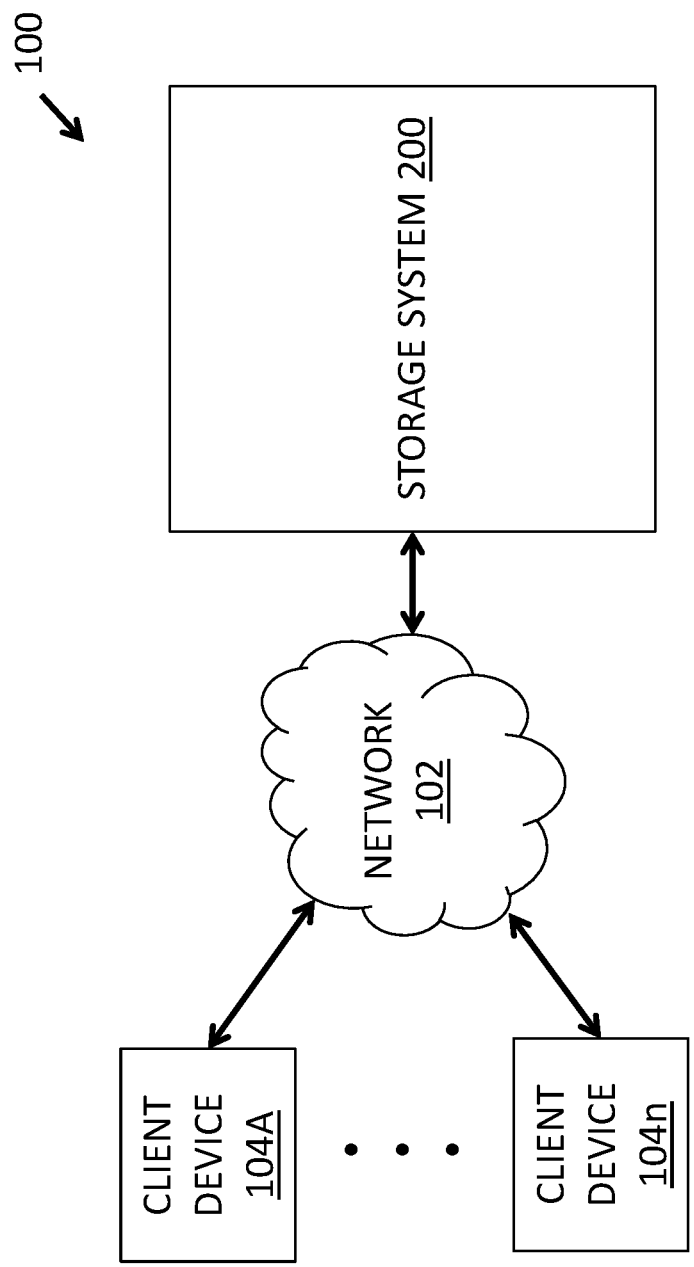
FIG. 1 is a block diagram of one embodiment of a storage network for providing dynamic index management for a set of computing storage resources.

Disclosed herein are various embodiments providing apparatus, systems, computer program products, and methods for booting a secondary operating system kernel with reclaimed primary kernel memory. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium may be a tangible device that can retain and store instructions for use by an instruction execution device. The computer-readable storage medium may be, but is not limited to, for example, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1 is a block diagram of one embodiment of a computing network 100 (or system) for providing dynamic index management for a set of computing storage resources. At least in the illustrated embodiment, the computing network 100 includes a network 102 connecting a set of client devices 104A through 104n (also simply referred individually, in various groups, or collectively as client device(s) 104) and a storage system 200.

The network 102 may include any suitable wired and/or wireless network 102 (e.g., public and/or private computer networks in any number and/or configuration (e.g., the Internet, an intranet, a cloud network, etc.)) that is known or developed in the future that enables the set of client devices 104 and the storage system 200 to be coupled to and/or in communication with one another and/or to share resources. In various embodiments, the network 102 can include a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources that are possible and contemplated herein.

A client device 104 can include any suitable computing hardware and/or software (e.g., a thick client, a thin client, or hybrid thereof) capable of accessing the storage system 200 via the network 102. Each client device 104, as part of its respective operation, relies on sending I/O requests to the storage system 200 to write data, read data, and/or modify data. Specifically, each client device 104 can transmit I/O requests to read, write, store, communicate, propagate, and/or transport instructions, data, computer programs, software, code, routines, etc., to the storage system 200 and may include at least a portion of a client-server model. In general, the storage system 200 can be accessed by the client device(s) 104 and/or communication with the storage system 200 can be initiated by the client device(s) 104 through a network socket (not shown) utilizing one or more inter-process networking techniques.

While the computing network 100 illustrated in FIG. 1 includes two (2) client devices 104 (e.g., client devices 104A and 104n), the various embodiments of the computing network 100 are not limited to two client devices 104. That is, a computing network 100 may include one (1) client device 104 or a quantity of client devices 104 that is greater than two client devices 104. In other words, various other embodiments of computing network 100 may include any suitable of quantity of client devices 104.

A storage system 200 may include any suitable hardware and/or software capable of performing data storage processes, functions, and/or algorithms, as discussed elsewhere herein. In various embodiments, a storage system 200 may include any suitable computing storage system and/or computing storage device that can store computer-readable data and/or computer-usable data. In some embodiments, the storage system 200 includes hardware and/or software configured to execute instructions in one or more modules and/or applications for including and/or providing dynamic index management for a set of computing storage resources, as discussed elsewhere herein.

Figure 2:
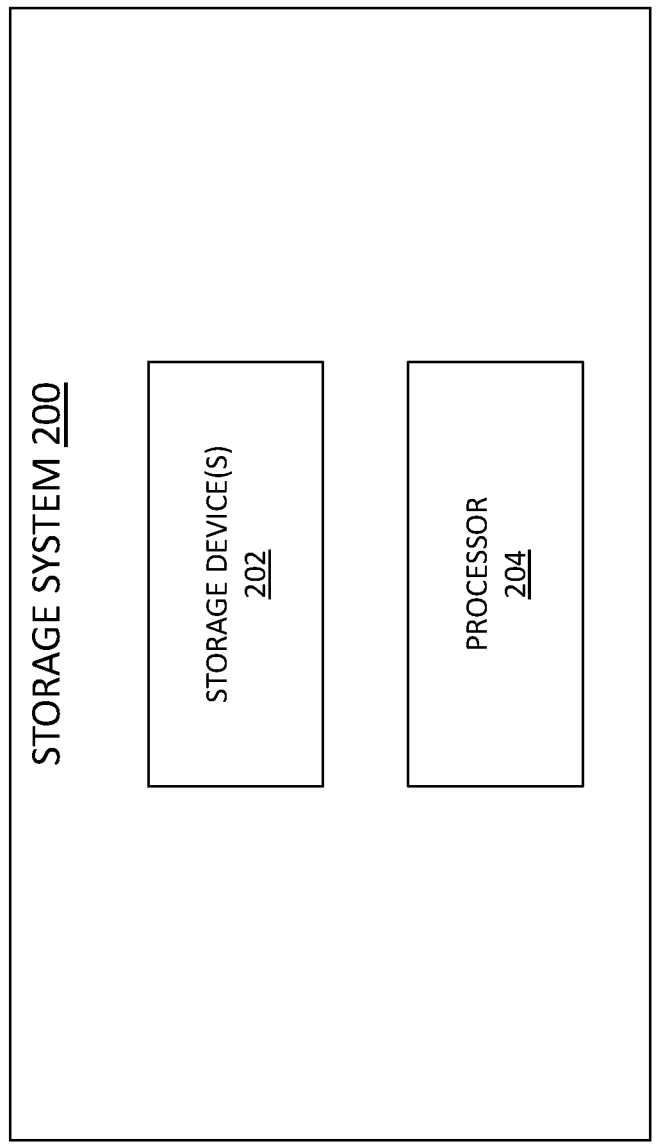
FIG. 2 is a block diagram of one embodiment of a storage system for providing dynamic index management for a set of computing storage resources included in the storage network of FIG. 1.

Referring to FIG. 2, FIG. 2 is a block diagram of one embodiment of a computing system 200 for providing dynamic index management for a set of computing storage resources. At least in the illustrated embodiment, the computing system 200 includes, among other components, a set of storage devices 202 and processor 204.

A set of storage devices 202 may include any suitable quantity of storage devices 202 that can store data for a particular application, function, and/or use. Further, each storage device 202 may include any suitable size and/or storage capacity that is known or developed in the future.

In addition, a storage device 202 may include any type of memory device that is known or developed in the future that is capable of storing data. The storage device(s) 202, in various embodiments, can include a set of indexes for locating data stored therein.

In some embodiments, a set of indexes includes a single index (e.g., a main or primary index). In additional or alternative embodiments, a set of indexes includes multiple indexes (e.g., a main or primary index and a secondary index). In further additional or alternative embodiments, a set of indexes includes additional indexes (e.g., a main or primary index and two or more secondary indexes).

In various embodiments, a storage device 202 may include one or more non-transitory computer-usable mediums (e.g., readable, writable, etc.), which can include any non-transitory and/or persistent apparatus or device that can contain, store, communicate, propagate, and/or transport instructions, data, computer programs, software, code, routines, etc., for processing by or in connection with a computer processing device (e.g., the processor 204). Further, a storage device 202 may include non-volatile/persistent hardware and/or software configured to perform long-term data storage operations, including, but not limited to, data archiving, data backup, data mirroring, and/or data replicating data, etc., among other long-term data storage operations that are possible and contemplated herein. For instance, a storage device 202 may include non-volatile and/or persistent hardware and/or software configured for performing long-term data storage operations, which may include write operations, read operations, and/or read-write operations, etc., among other storage operations that are possible and contemplated herein.

In various embodiments, the storage device(s) 202 can be implemented as flash memory (e.g., a solid-state devices (SSD) or other non-volatile storage devices that store persistent data). Further, a storage device 202, in some embodiments, may include non-transitory memory such as, for example, a dynamic random access memory (DRAM) device, a static random access memory (SRAM) device, a hard disk drive (HDD), storage tape (e.g., magnetic and/or virtual), and/or other types (e.g., non-volatile and/or persistent) of memory devices, etc., among other types of non-transitory memory that are possible and contemplated herein.

A processor 204 may include any suitable hardware and/or software capable of performing computer processes, functions, and/or algorithms. In various embodiments, the processor 204 includes hardware and/or software configured to execute instructions in one or more modules and/or applications for including and/or providing dynamic index management for a set of computing storage resources (e.g., the storage device(s) 202), as discussed elsewhere herein.

Figure 3A:
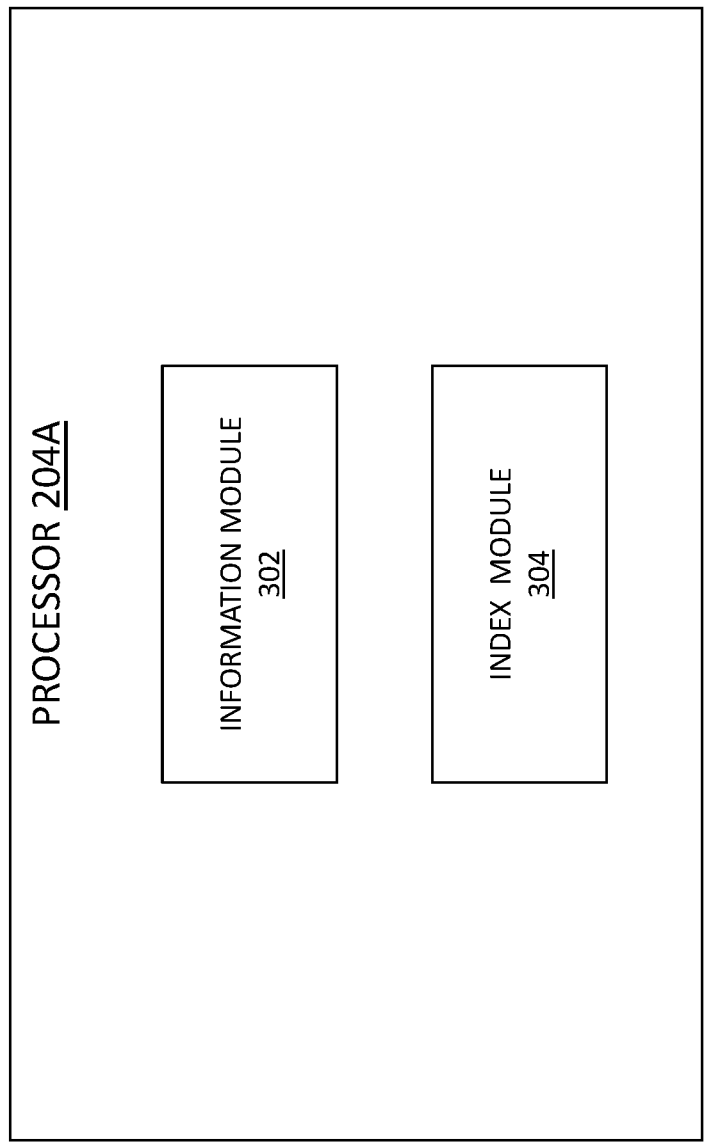
FIGS. 3A through 3C are block diagrams of various embodiments of a processor for providing dynamic index management for a set of computing storage resources included in the storage system of FIG. 2.

With reference to FIG. 3A, FIG. 3A is a block diagram illustrating one embodiment of a processor 204A that can be included in and/or as a portion of a storage system 200. At least in the illustrated embodiment, a processor 204A includes, among other components, an information module 302 and an index module 304 coupled to and/or in communication with one another.

An information module 302 may include any suitable hardware and/or software that can collect performance data for a set of storage resources (e.g., the storage device(s) 202) storing data. That is, the information module 302 can be configured to determine, detect, calculate, and/or gather a set of current performance data for the storage device(s) 202.

A set of current performance data may include any suitable quantity of performance metrics that can indicate what operations and/or functions the storage device(s) 202 is/are performing and/or the degree of efficiency with which the storage device(s) 202 are performing such operations/functions. In some embodiments, a set of current performance data includes and/or is based on a single performance metric. In other embodiments, a set of current performance data includes and/or is based on two or more performance metrics.

A performance metric may include any suitable quantifiable operation and/or function the storage device(s) 202 is/are performing and/or the degree of efficiency with which the storage device(s) 202 are performing such operation/function. Non-limiting examples of a performance metric include, but are not limited to, data processing execution time(s) in the storage device(s) 202, storage space usage in the storage device(s) 202, storage hot spots in the storage device(s) 202, and/or index usage by the storage device(s) 202, etc., among other metrics that are indicative of the operation(s) and/or function(s) the storage device(s) 202 is/are performing and/or the degree of efficiency with which the storage device(s) 202 are performing such operation(s)/function(s) that are possible and contemplated herein.

An index module 304 may include any suitable hardware and/or software that can implement a set of indexes (e.g., one or more indexes) for the data stored on a set of storage resources (e.g., the storage device(s) 202). An index (e.g., a primary index or a secondary index) may include any suitable type of index that is known or developed in the future.

In various embodiments, an index can include an In-Memory index or a Bufferpool index. Non-limiting examples of an In-Memory index include, but are not limited to, a hash index (e.g., an In-Memory Hash index, etc.), a non-clustered index (e.g., a binary search index (B–tree index), etc.), and a clustered index (e.g., an In-Memory Fixed Length Tree index, a Fast Traverse Block index, etc.), among other indexes that are possible and contemplated herein. Non-limiting examples of a Bufferpool index include, but are not limited to, a Sparse index, a B+tree index, and a hash index, etc., among other indexes that are possible and contemplated herein.

Figure 3B:
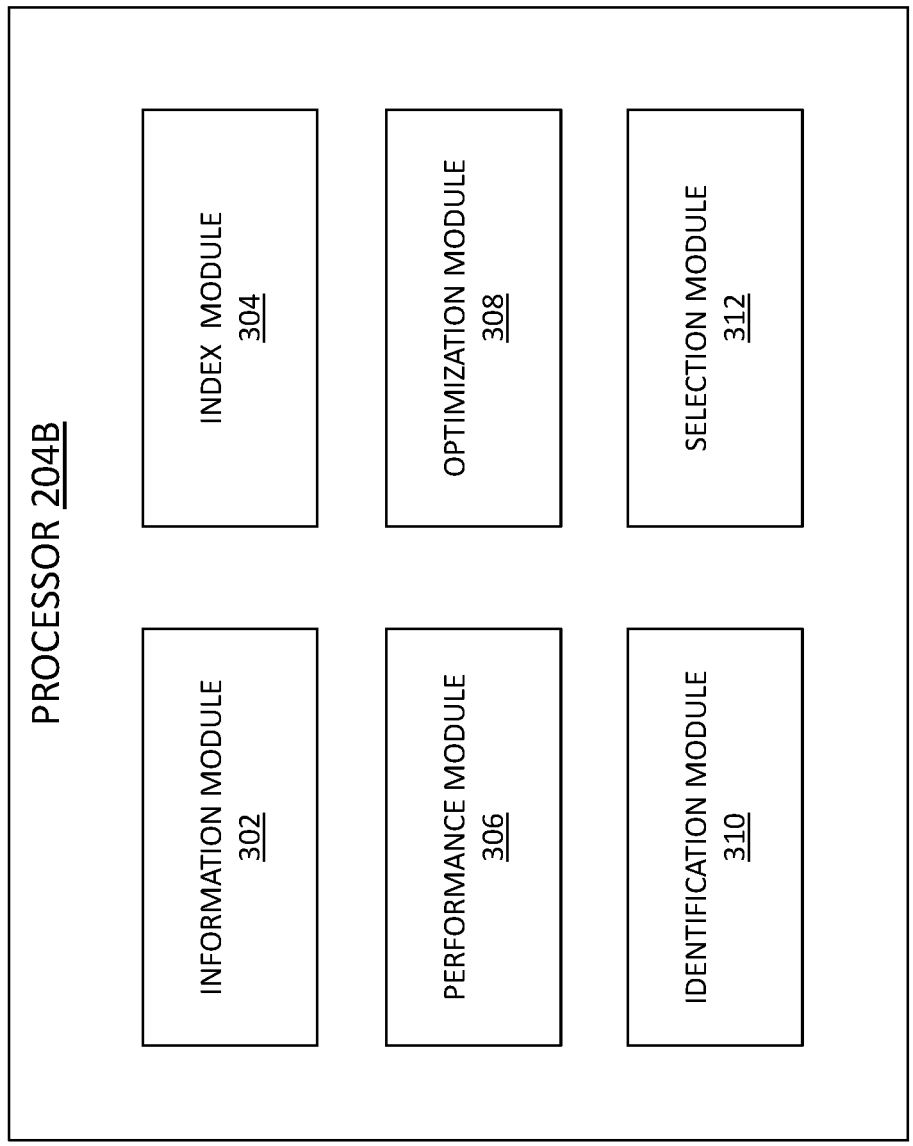
Figure 3C:
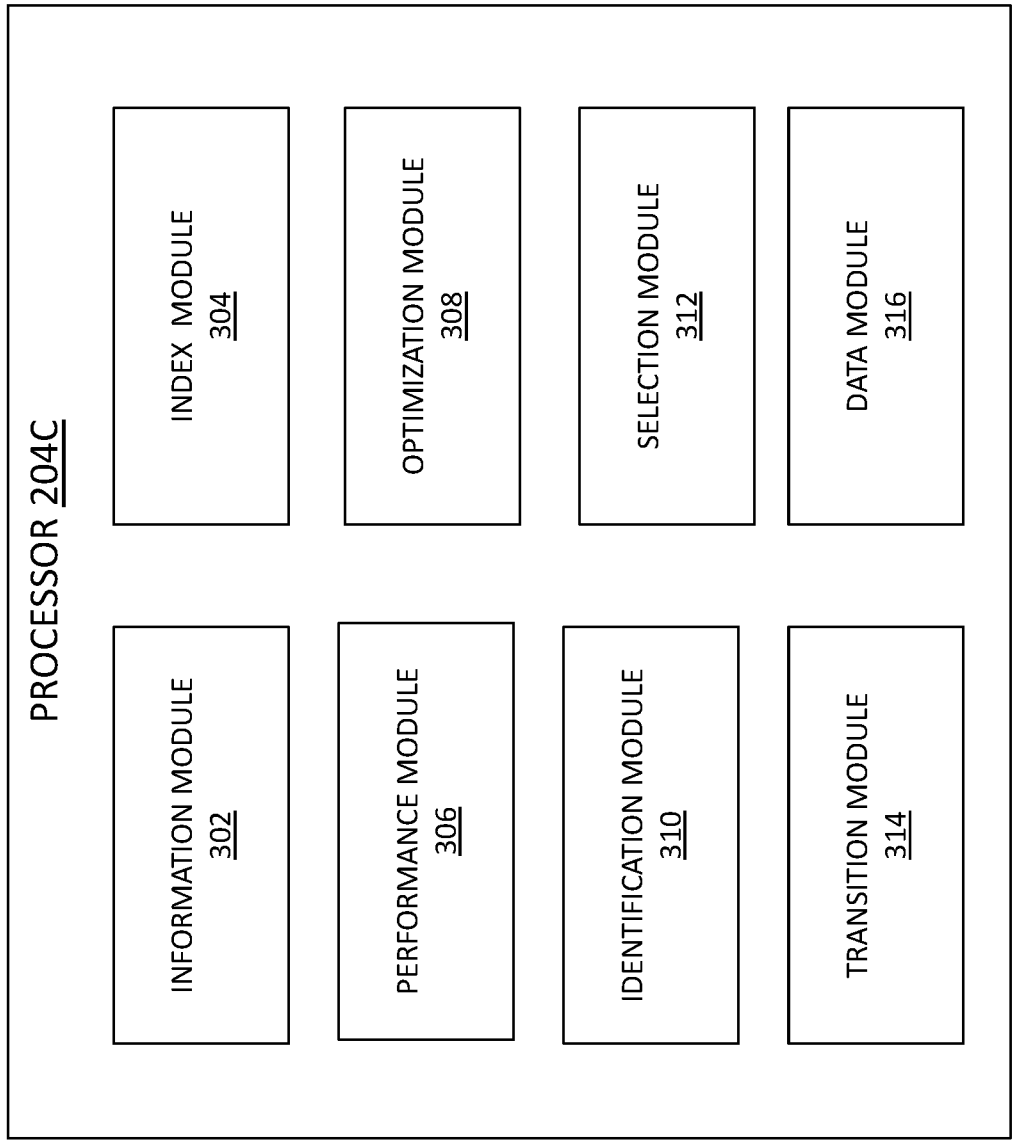

The index module 304, in various embodiments, is configured to implement the one or more indexes for the data stored on the storage device(s) 202 based on the set of current performance data collected by the information module 302 and a set of predicted performance data for the storage device(s) 202 predicted by a performance module 306 (see e.g., FIGS. 3B and 3C). In some embodiments, a set of indexes includes a primary index. In other embodiments, a set of indexes includes a primary index and one or more secondary indexes.

In various embodiments, the index module 304 is configured to maintain or replace the primary index based on the set of current performance data collected by the information module 302 and a set of predicted performance data for the storage device(s) 202. Similarly, the index module 304 is configured to maintain the current primary index and each current secondary index in a set of current secondary indexes based on the set of current performance data collected by the information module 302 and a set of predicted performance data for the storage device(s) 202. Similar still, the index module 304 is configured to replace the primary index with a new primary index and replace one or more current secondary indexes with one or more new secondary indexes and/or maintain one or more current secondary indexes based on the set of current performance data collected by the information module 302 and a set of predicted performance data for the storage device(s) 202.

An implemented set of indexes can include any suitable quantity of indexes that can improve and/or optimize the performance of the storage device(s) 202 when utilized to locate data stored on the storage device(s) 202. In various embodiments, an implemented set of indexes includes one index (e.g., a primary index).

Figure 4A:
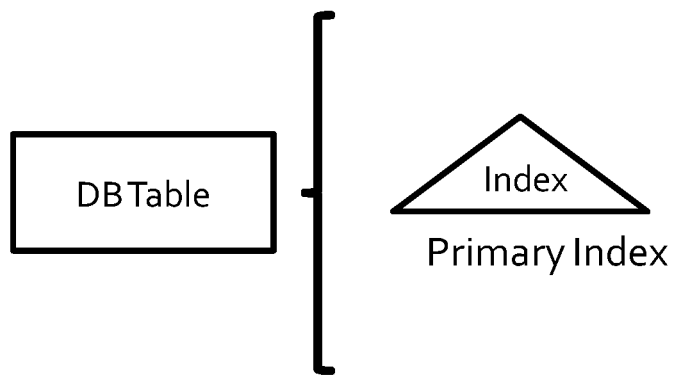
FIGS. 4A through 4F are diagrams illustrating various examples of operations for implementing a set of indexes performed by an index module included in the processors of FIGS. 3A through 3C.
Figure 4B:
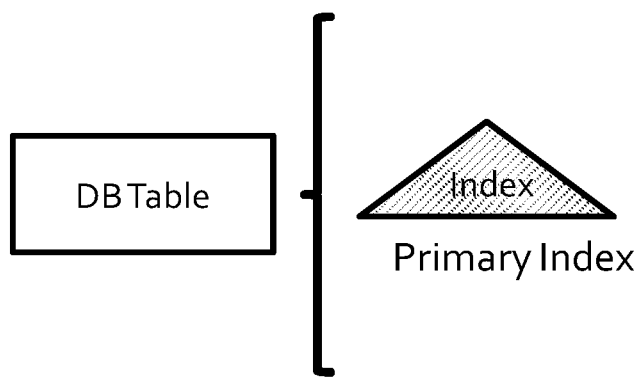

In some embodiments, an index module 304, in implementing a set of indexes, is configured to maintain a current primary index (see e.g., FIG. 4A) or replace the current primary index with a new primary index (see e.g., FIG. 4B). For example, in response to a determination that the current primary index optimizes performance of the storage device(s) 202 when utilized as a primary index to locate data stored on the storage device(s) 202 in comparison to other indexes that are possible and/or available for implementation as a primary index, the index module 304 implements the current primary index by maintaining the current primary index as such (FIG. 4A). Further, in response to a determination that a different index improves and/or optimizes performance of the storage device(s) 202 when utilized as a primary index to locate data stored on the storage device(s) 202 in comparison to the current primary index, the index module 304 implements the different index by replacing the current primary index with the different index as a new primary index (FIG. 4B).

Figure 4C:
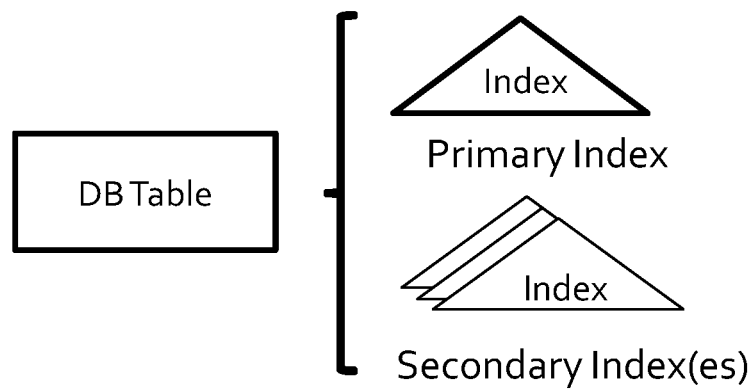

In additional or alternative embodiments, an implemented set of indexes includes multiple indexes (e.g., a primary index and one or more secondary indexes). In some embodiments, an index module 304, in implementing a set of indexes, is configured to implement multiple indexes by maintaining the current primary index and maintaining each secondary index in a set of secondary indexes (see e.g., FIG. 4C). For example, in response to a determination that the current primary index optimizes performance of the storage device(s) 202 when utilized as a primary index to locate data stored on the storage device(s) 202 in comparison to other indexes that are possible and/or available for implementation as a primary index, the index module 304 implements the current primary index by maintaining the current primary index as such. Further, in response to a determination that each current secondary index in a set of secondary indexes (e.g., one or more secondary indexes) optimizes performance of the storage device(s) 202 when utilized as a secondary index to locate data stored on the storage device(s) 202 in comparison to other indexes that are possible and/or available for implementation as a secondary index, the index module 304 implements the current secondary index(es) by maintaining each current secondary index as such.

Figure 4D:
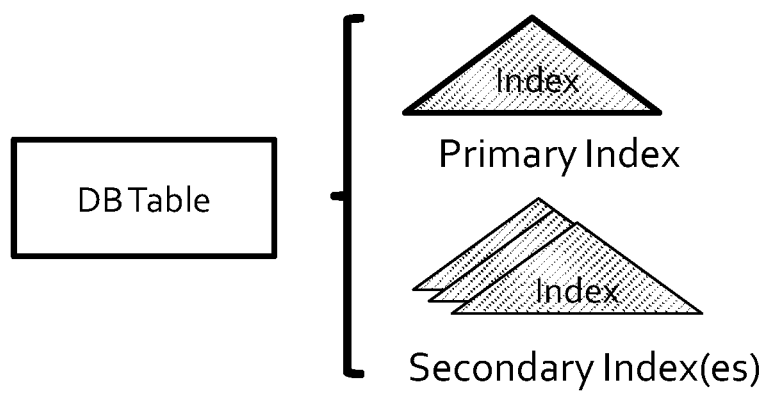

In additional or alternative embodiments, an index module 304, in implementing a set of indexes, is configured to implement multiple indexes by replacing the current primary index with a new primary index and replacing each current secondary index in a set of secondary indexes with a new secondary index (see e.g., FIG. 4D). For example, in response to a determination that a different index that is possible and/or available for implementation as a primary index improves and/or optimizes performance of the storage device(s) 202 when utilized as a primary index to locate data stored on the storage device(s) 202 in comparison to the current primary index, the index module 304 implements the different index by replacing the current primary index with the different index as a new primary index. Further, in response to a determination that one or more different indexes that are possible and/or available for implementation as a secondary index optimize performance of the storage device(s) 202 when utilized as a secondary index to locate data stored on the storage device(s) 202 in comparison to each current secondary index in a set of current secondary indexes, the index module 304 implements the different index(es) by replacing each current secondary index with a respective and/or corresponding different index as a new secondary index.

Figure 4E:
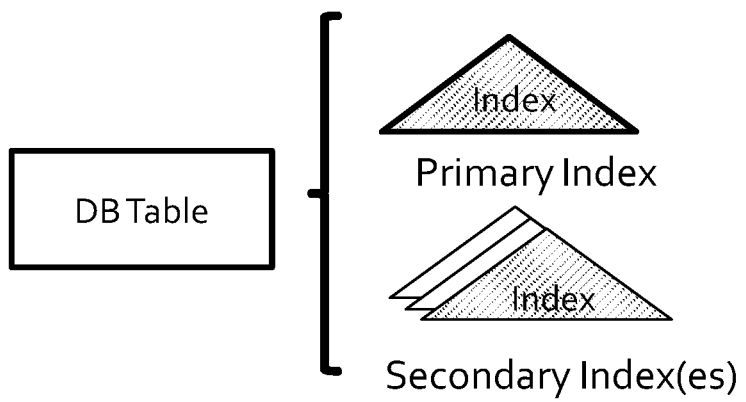

In further additional or alternative embodiments, an index module 304, in implementing a set of indexes, is configured to implement multiple indexes by replacing the current primary index with a new primary index, replacing one or more current secondary index in a set of secondary indexes with a new secondary index, and maintaining one or more current secondary index in the set of secondary indexes as such (see e.g., FIG. 4E). For example, in response to a determination that a different index that is possible and/or available for implementation as a primary index improves and/or optimizes performance of the storage device(s) 202 when utilized as a primary index to locate data stored on the storage device(s) 202 in comparison to the current primary index, the index module 304 implements the different index by replacing the current primary index with the different index as a new primary index. Further, in response to a determination that one or more different indexes that are possible and/or available for implementation as a secondary index optimize performance of the storage device(s) 202 when utilized as a secondary index to locate data stored on the storage device(s) 202 in comparison to one or more current secondary indexes in a set of current secondary indexes, the index module 304 implements the different index(es) by replacing the current secondary index(es) with a respective and/or corresponding different index as a new secondary index. Further still, in response to a determination that one or more current secondary indexes in the set of secondary indexes optimizes performance of the storage device(s) 202 when utilized as a secondary index to locate data stored on the storage device(s) 202 in comparison to one or more other indexes that are possible and/or available for implementation as a secondary index, the index module 304 implements the current secondary index(es) by maintaining each current secondary index as such.

Figure 4F:
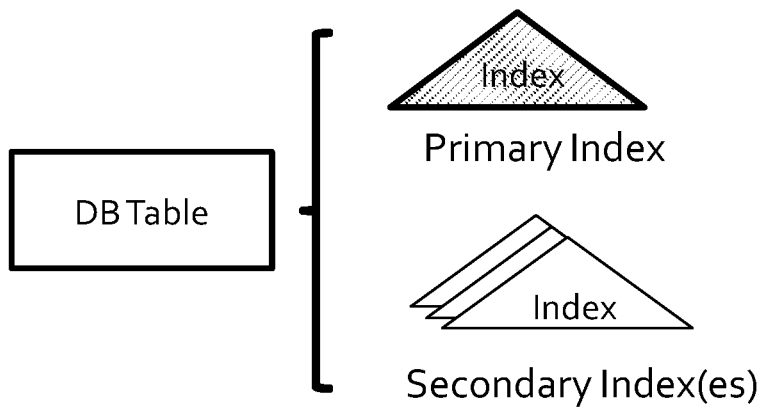

In still further additional or alternative embodiments, an index module 304, in implementing a set of indexes, is configured to implement multiple indexes by replacing the current primary index with a new primary index and maintaining one or more current secondary index in the set of secondary indexes as such (see e.g., FIG. 4F). For example, in response to a determination that a different index that is possible and/or available for implementation as a primary index improves and/or optimizes performance of the storage device(s) 202 when utilized as a primary index to locate data stored on the storage device(s) 202 in comparison to the current primary index, the index module 304 implements the different index by replacing the current primary index with the different index as a new primary index. Further, in response to a determination that one or more current secondary indexes in the set of secondary indexes optimizes performance of the storage device(s) 202 when utilized as a secondary index to locate data stored on the storage device(s) 202 in comparison to one or more other indexes that are possible and/or available for implementation as a secondary index, the index module 304 implements the current secondary index(es) by maintaining each current secondary index as such.

In various embodiments, an index module 304 is configured to communicate with a selection module 312 (see e.g., FIGS. 3B and 3C). In some embodiments, the index module 304 is configured to receive a notice and/or a command from the selection module 312 indicating which index(es) of a set of indexes to implement in the storage device(s) 202.

Referring to FIG. 3B, FIG. 3B is a block diagram illustrating another embodiment of a processor 204B that can be included in and/or as a portion of a storage system 200. The processor 204B includes an information module 302 and an index module 304 similar to the processor 204A discussed above. At least in the illustrated embodiment, the processor 204B further includes, among other components, a performance module 306, an optimization module 308, an identification module 310, and a selection module 312 coupled to and/or in communication with one another.

A performance module 306 may include any suitable hardware and/or software that can calculate and/or predict performance data for a set of storage resources (e.g., the storage device(s) 202). In various embodiments, the performance module 306 calculates and/or predicts the performance data for the storage device(s) 202 utilizing a machine learning algorithm. The machine learning algorithm may include any suitable machine learning algorithm and/or technique that is known or developed in the future.

In various embodiments, the predicted performance data is calculated and/or determined based on the predicted performance of the storage device(s) 202 when utilizing different combinations of sets of indexes to locate data on the storage device(s) 202. The different sets of indexes from which the predicted performance data is calculated and/or determined can include one or more indexes. For example, a set of indexes including one or a single index can include a primary index. In other non-limiting examples, a set of indexes including multiple indexes can include a primary index and one or more secondary indexes.

In various embodiments, the predicted performance of the storage device(s) 202 when utilizing a combination indexes (e.g., a primary index or a primary index and one or more secondary indexes) is based on a set of performance metrics defining a total cost for a particular combination of indexes. A set of performance metrics, in some embodiments, includes an execution time for locating data stored on the storage device(s) 202 using a particular combination of indexes and an amount of storage space on the storage device(s) 202 consumed by the particular combination of indexes. In some embodiments, the total cost is calculated by multiplying the execution time ($Exec_{time}$) for locating data stored on the storage device(s) 202 using a particular combination of indexes (e.g., a primary index or a primary index and one or more secondary indexes) and the amount of storage space on the storage device(s) 202 consumed by the particular combination of indexes ($index_{cost}$). The following illustrates one example of an equation for calculating the total cost for an index combination.

$$(\text{total\_cost}) = \sum_{k=1}^{n}(Exec_{time} \times index_{cost})$$

In additional or alternative embodiments, the performance module 306 is configured to calculate the total cost for multiple different combinations of indexes. In some embodiments, the performance module 306 is configured to calculate the total cost for each possible combination of indexes (e.g., two or more index combinations or each possible combination of a primary index and/or a primary index and one or more secondary indexes) that is available for use with the data stored on the storage device(s) 202. In other embodiments, the performance module 306 is configured to calculate the total cost for a subset and/or a portion of the possible combinations of one or more indexes (e.g., two or more index combinations or tow or more possible combinations of a primary index and/or a primary index and one or more secondary indexes) that are available for use with the data stored on the storage device(s) 202.

In various additional or alternative embodiments, the predicted performance of the storage device(s) 202 when utilizing a combination indexes (e.g., a primary index or a primary index and one or more secondary indexes) is based on a weighted set of performance metrics defining a weighted total cost for a particular combination of indexes. A weighted set of performance metrics, in some embodiments, includes an execution time for locating data stored on the storage device(s) 202 using a particular combination of indexes, an amount of storage space on the storage device(s) 202 consumed by the particular combination of indexes, and a weighting factor. In some embodiments, the total cost is calculated by multiplying the execution time ($Exec_{time}$) for locating data stored on the storage device(s) 202 using a particular combination of indexes (e.g., a primary index or a primary index and one or more secondary indexes), the amount of storage space on the storage device(s) 202 consumed by the particular combination of indexes ($index_{cost}$), and a weighting factor ($Priority_{weight}$).

In various embodiments, a weighting factor can correspond to a priority associated with a particular metric and/or factor. A weighting factor may include any suitable value that can modify (e.g., increase or decrease) a multiplicative quantity or result. In some embodiments, the weighting factor includes a value in the range of about 0.01 to about 0.99, among other sized ranges, ranges of values, and/or values that can multiplicatively reduce a quantity or result. In other embodiments, the weighting factor includes a value in the range of about 1.01 to about 2.0, among other sized ranges, ranges of values, and/or values that can multiplicatively increase a quantity or result.

Further, a weighting factor may be based on any suitable metric/factor that is known or possible. Non-limiting examples of a basis and/or metric/factor for a weighting factor include, but are not limited to, the type of data stored on the storage device(s) 202, an application that uses the data stored on the storage device(s) 202, and/or an owner of the data stored on the storage device(s) 202, etc., among other metrics/factors that are possible and contemplated herein. The following illustrates one example of an equation for calculating the weighted total cost for an index combination.

$$(\text{total\_cost}) = \sum_{k=1}^{n}(Exec_{time} \times index_{cost} \times Priority_{weight})$$

In additional or alternative embodiments, the performance module 306 is configured to calculate the weighted total cost for multiple different combinations of indexes. In some embodiments, the performance module 306 is configured to calculate the weighted total cost for each possible combination of one or more indexes (e.g., two or more index combinations or each possible combination of a primary index and/or a primary index and one or more secondary indexes) that is available for use with the data stored on the storage device(s) 202. In other embodiments, the performance module 306 is configured to calculate the weighted total cost for a subset and/or a portion of the possible combinations of one or more indexes (e.g., two or more index combinations or two or more possible combinations of a primary index and/or a primary index and one or more secondary indexes) that are available for use with the data stored on the storage device(s) 202.

In various embodiments, the performance module 306 is configured to communicate with an optimization module 308 to transmit each calculated total cost and/or each calculated weighted total cost for the multiple different combinations of indexes to the optimization module 308. Further, the optimization module 308 is configured to receive each calculated total cost and/or each calculated weighted total cost from the performance module 306.

An optimization module 308 may include any suitable hardware and/or software that can determine and/or predict which combination of indexes (e.g., a primary index or a primary index and one or more secondary indexes), when implemented, will improve and/or optimize the operations and/or functions of a set of storage resources (e.g., storage device(s) 202). In various embodiments, the optimization module 308 determines and/or predicts which combination of indexes, when implemented, will improve and/or optimize the operations and/or functions of the storage device(s) 202 based on the calculated total costs and/or the calculated weighted total costs for the multiple different combinations of indexes received from the performance module 306.

In determining and/or predicting which combination of indexes, when implemented, will improve and/or optimize the operations and/or functions of the storage device(s) 202, the optimization module 308, in some embodiments, is configured to compare the calculated total cost for each combination of indexes to one another and rank each combination of indexes based on the comparison. In various embodiments, the optimization module 308 is configured to rank each combination of indexes from highest total cost to lowest total cost or from lowest total cost to highest total cost.

In additional or alternative embodiments, in determining and/or predicting which combination of indexes (e.g., a primary index or a primary index and one or more secondary indexes), when implemented, will improve and/or optimize the operations and/or functions of the storage device(s) 202, the optimization module 308 is configured to compare the calculated weighted total cost for each combination of indexes to one another and rank each combination of indexes based on the comparison. In various embodiments, the optimization module 308 is configured to rank each combination of indexes from highest weighted total cost to lowest weighted total cost or from lowest weighted total cost to highest weighted total cost.

In various embodiments, the optimization module 308 is configured to communicate with an identification module 310 to transmit the ranking of total cost and/or the ranking of weighted total cost for the multiple different combinations of indexes to the identification module 310. Further, the identification module 310 is configured to receive the ranking of total cost and/or the ranking of weighted total cost for the multiple different combinations from the optimization module 308.

An identification module 310 may include any suitable hardware and/or software that can identify which combination of indexes (e.g., a particular primary index or a particular primary index and one or more particular secondary indexes), when implemented, will improve and/or optimize the operations and/or functions of a set of storage resources (e.g., storage device(s) 202). In various embodiments, the identification module 310 identifies which combination of indexes, when implemented, will improve and/or optimize the operations and/or functions of the storage device(s) 202 based on the ranking of total cost and/or the ranking of weighted total cost for the multiple different combinations received from the optimization module 308.

In some embodiments, the identification module 310 identifies which combination of indexes, when implemented, will improve and/or optimize the operations and/or functions of the storage device(s) 202 by identifying the particular primary index or the particular primary index and the one or more particular secondary indexes (e.g., a particular combination of indexes) with the lowest total cost. In additional or alternative embodiments, the identification module 310 identifies which combination of indexes, when implemented, will improve and/or optimize the operations and/or functions of the storage device(s) 202 by identifying the particular primary index or the particular primary index and the one or more particular secondary indexes (e.g., a particular combination of indexes) with the lowest weighted total cost.

In various embodiments, the identification module 310 is configured to communicate with selection module 312 to transmit the identity of the combination of indexes (e.g., the particular primary index or the particular primary index and the one or more particular secondary indexes) with the lowest total cost and/or the identity of the combination of indexes with the lowest weighted total cost to the selection module 312. Further, the selection module 312 is configured to receive the identity of the particular primary index or the particular primary index and the one or more particular secondary indexes (e.g., the combination of indexes) with the lowest total cost and/or the identity of the combination of indexes with the lowest weighted total cost from the identification module 310.

A selection module 312 may include any suitable hardware and/or software that can select for implementation a combination of indexes that improves and/or optimizes the operations and/or functions of a set of storage resources (e.g., storage device(s) 202). In various embodiments, the selection module 312 selects a combination of indexes for implementation that improves and/or optimizes the operations and/or functions of the storage device(s) 202 based on the identity of the combination of indexes (e.g., the particular primary index or the particular primary index and the one or more particular secondary indexes) with the lowest total cost and/or the identity of the combination of indexes (e.g., the particular primary index or the particular primary index and the one or more particular secondary indexes) with the lowest weighted total cost received from the identification module 310.

In some embodiments, the selection module 312 selects for implementation the combination of indexes identified by the identification module 310 as the combination of indexes (e.g., the particular primary index or the particular primary index and the one or more particular secondary indexes) with the lowest total cost. In additional or alternative embodiments, the selection module 312 selects for implementation the combination of indexes identified by the identification module 310 as the combination of indexes (e.g., the particular primary index or the particular primary index and the one or more particular secondary indexes) with the lowest weighted total cost.

In various embodiments, the selection module 312 is configured to communicate with the index module 304. The selection module 312 is further configured to transmit the identity of the selected combination of indexes (e.g., the particular primary index or the particular primary index and the one or more particular secondary indexes) for implementation to the index module 304.

With reference to FIG. 3C, FIG. 3C is a block diagram illustrating another embodiment of a processor 204C that can be included in and/or as a portion of a storage system 200. The processor 204C includes an information module 302, an index module 304, a performance module 306, an optimization module 308, an identification module 310, and a selection module 312 similar to the processor 204B discussed above. At least in the illustrated embodiment, the processor 204C further includes, among other components, a transition module 314 and a data module 316 coupled to and/or in communication with one another.

Figure 5:
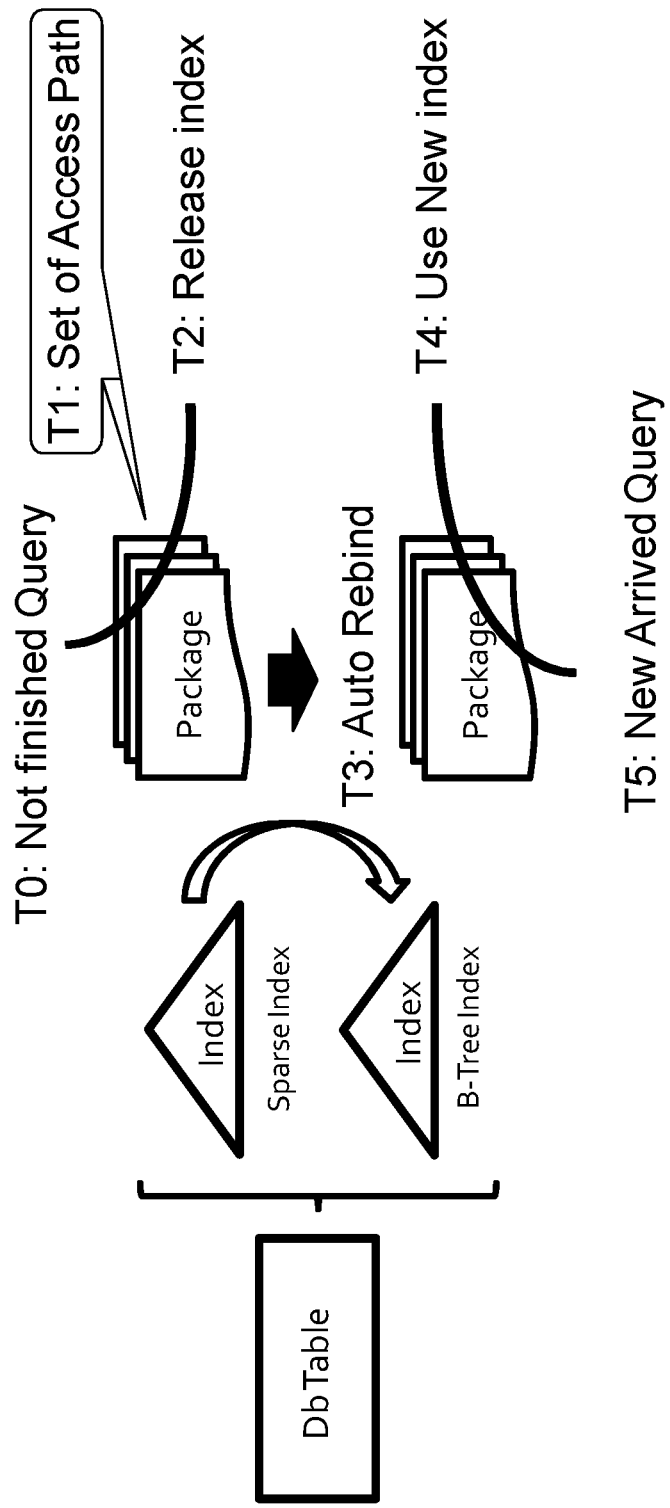
FIG. 5 is a timing diagram illustrating one example of operations for a transition module included in the processor of FIG. 3C.

A transition module 314 may include any suitable hardware and/or software that can complete data transactions and/or facilitate completing transactions that are in progress when a primary index is being replaced or the primary index and one or more secondary indexes are being replaced. With reference to FIG. 5, the transition module 314, in various embodiments, is configured to determine that a set of data transactions (e.g., a query) for a set of data packages is in progress and/or is not complete at the time that the primary index is being replaced or at the time that the primary index and one or more secondary indexes are being replaced (time T0).

The transition module 314 is further configured to set and/or establish an access path to one or more storage locations in the storage device(s) 202 in response to determining that the data transaction(s) is/are in progress and/or are not yet completed (time T1). Further, the transition module 314, upon establishing the access path to the storage location(s) in the storage device(s) 202, is configured to detect and/or determine that the index module 304 has released the current primary index or the current primary index and one or more current secondary indexes (time T2). In addition, the transition module 314 is configured to automatically rebind the set of data packages after detecting/determining that the current primary index or the current primary index and one or more current secondary indexes have been released by the index module 304 (time T3).

The transition module 314 is further configured to detect and/or determine that the index module 304 has implemented a new primary index or the new current primary index and one or more new secondary indexes (time T4). In response to the detection/determination, the transition module 314 is configured to receive and/or facilitate receiving data transactions at the storage device(s) 202 using the new primary index or the new current primary index and one or more new secondary indexes (time T5).

Figure 6:
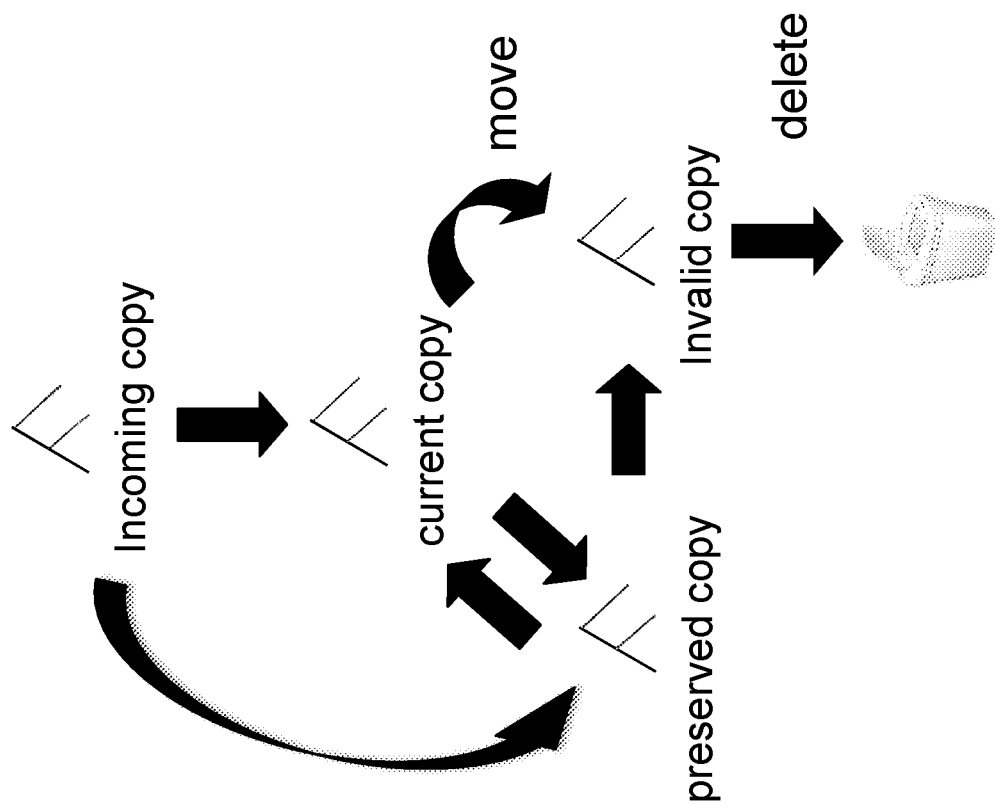
FIG. 6 is a diagram illustrating one example of operations for a data module included in the processor of FIG. 3C.

Referring again to FIG. 3C, a data module 316 may include any suitable hardware and/or software that can manage data and/or data packages in response to implementation of a set of indexes. With reference to FIG. 6, a data module 316, in various embodiments, is configured to receive a copy of a data package (e.g., an incoming copy).

The data module 316 is configured to utilize the incoming copy as the current copy of the data package or store the incoming copy as a preserved copy. Further, the data module 316 can further utilize the preserved copy of the data package as the current copy, as needed.

In various embodiments, the data module 316 can determine whether a current copy of the data package will be utilized. In response to determining that the current copy of the data package will be not utilized, the data module 316 is configured to store this copy as a preserved copy and/or mark this current copy as an invalid copy.

Similarly, the data module 316 can determine whether a preserved copy of the data package will be utilized. In response to determining that the preserved copy of the data package will be not utilized, the data module 316 is configured to mark this preserved copy as an invalid copy.

The data module 316, in various embodiments, is configured to move invalid current copies and/or invalid preserved copies to trash and subsequently delete each invalid current copy and/or invalid preserved copy in the trash. The data module 316 can then release for consumption the storage space in the storage device(s) 202 that were occupied and now vacated by each deleted invalid current copy and/or invalid preserved copy.

Figure 7:
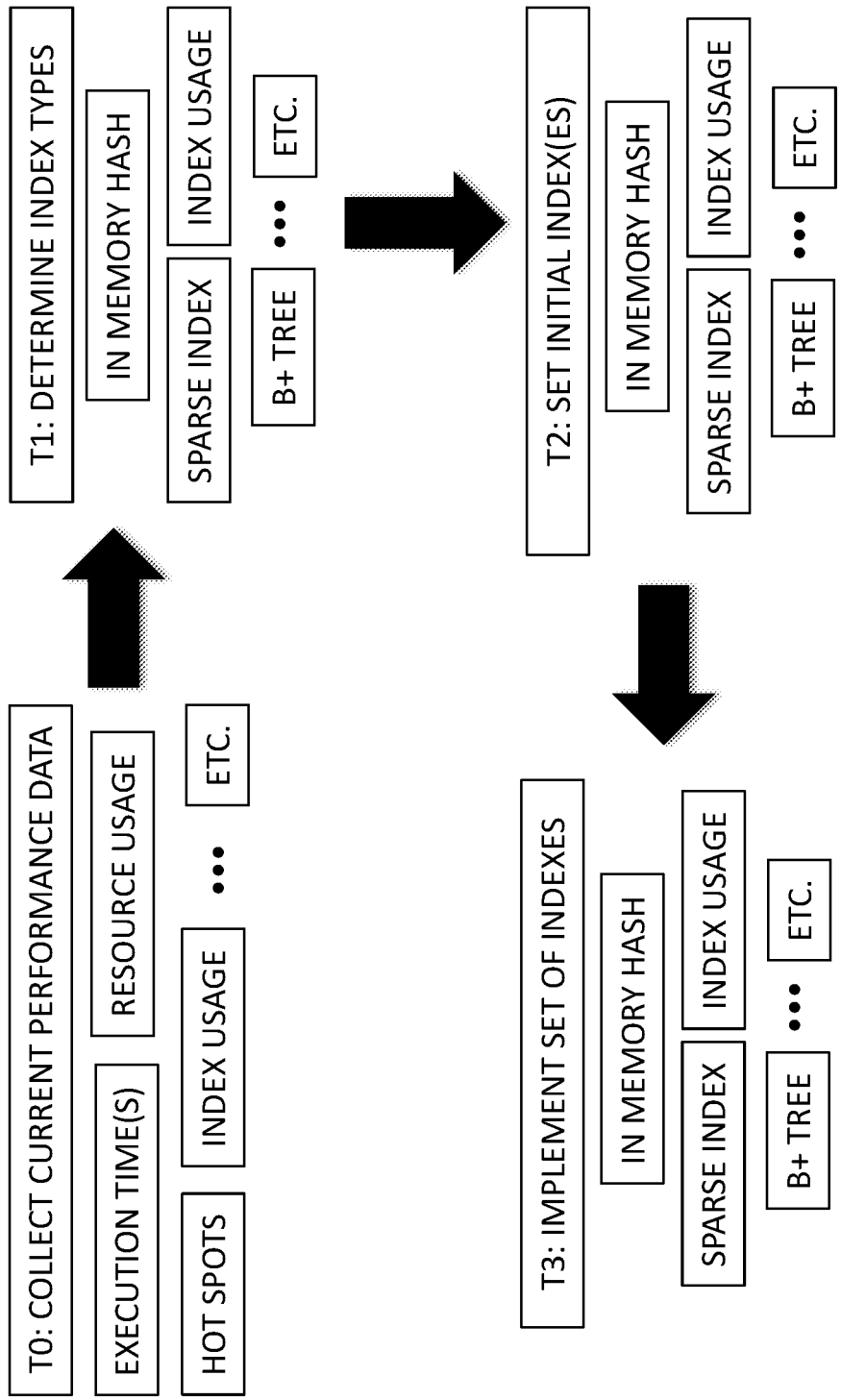
FIG. 7 is a flow diagram illustrating operations for various embodiments of a processor included in FIGS. 3A through 3C.

With reference to FIG. 7, FIG. 7 is a flow diagram illustrating operations of one embodiment of a processor 204A, 204B and/or 204C (also simply referred individually, in various groups, or collectively as processor(s) 204). At time T0, the processor 204 collects current performance data for the storage device(s) 202.

The processor 204, at time T1, can determine the types of indexes that are available for use with the data stored on the storage device(s) 202 (time T1) and implement an initial set of indexes (e.g., a primary index or the primary index and one or more secondary index) at time T2. At a future time (e.g., time T3), the processor 204 can, based on an optimized performance predicted for the storage device(s) 202 (which is based on a collected set of current performance data and a set of predicted performance data for the storage device(s) 202), maintain the current primary index (FIG. 4A), replace the current primary index with a new primary index (FIG. 4B), maintain the current primary index and each secondary index (FIG. 4C), replace the current primary index with a new primary index and replace each current secondary index (FIG. 4D), replace the current primary index with a new primary index, replace one or more secondary indexes with a new secondary index, and maintain one or more secondary indexes (FIG. 4E), or replace the current primary index with a new primary index and maintain each secondary index (FIG. 4F).

Figure 8:
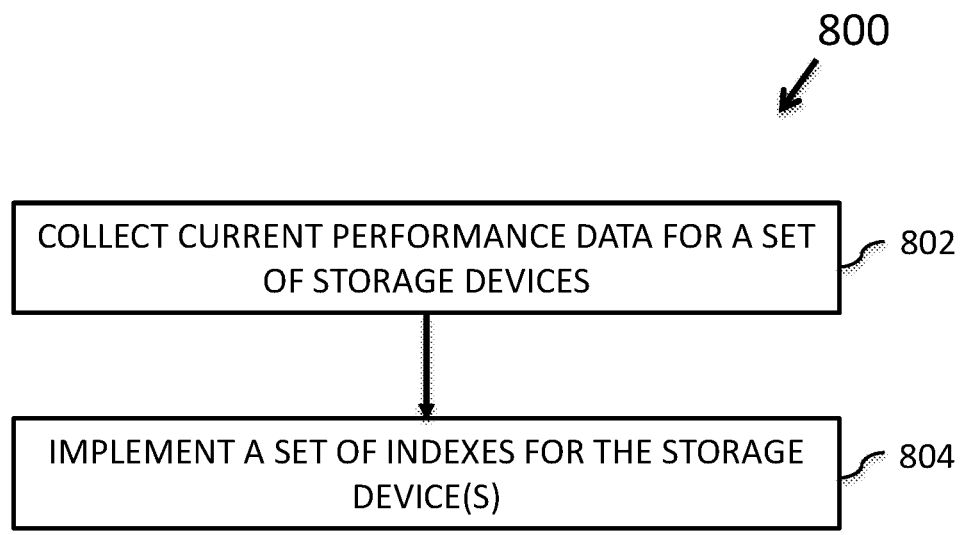
FIG. 8 is a schematic flow chart diagram illustrating one embodiment of a method for providing dynamic index management for a set of computing storage resources.

Referring to FIG. 8, FIG. 8 is a schematic flow chart diagram illustrating one embodiment of a method 800 for providing dynamic index management for a set of computing storage resources (e.g., storage device(s) 202). At least in the illustrated embodiment, the method 800 can begin by a processor 204 collecting a set of current performance data for the storage device(s) 202 (e.g., a set of storage resources) storing data (block 802).

The processor 204 can implement a set of indexes (e.g., one or more indexes (e.g., a primary index or the primary index and one or more secondary indexes) on the storage device(s) 202 (block 804). The set of indexes is implemented based on an optimized performance predicted for the storage device(s) 202, as discussed elsewhere herein. In some embodiments, the predicted optimized performance is based on the collected set of current performance data and a set of predicted performance data that identifies and/or uses the implemented set of indexes, as discussed elsewhere herein.

Figure 9:
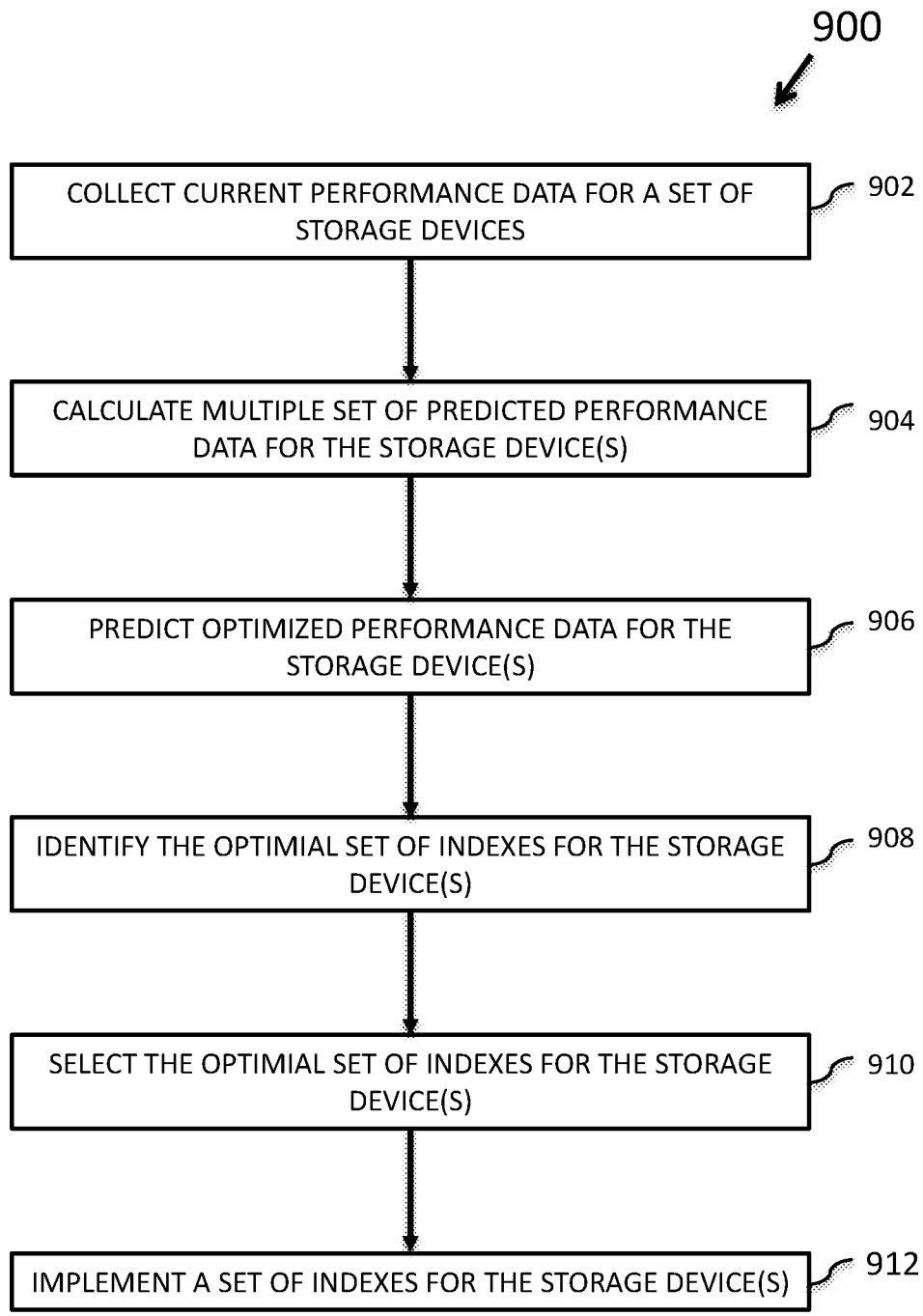
FIG. 9 is a schematic flow chart diagram illustrating another embodiment of a method for providing dynamic index management for a set of computing storage resources.

Referring to FIG. 9, FIG. 9 is a schematic flow chart diagram illustrating another embodiment of a method 900 for providing dynamic index management for a set of computing storage resources (e.g., storage device(s) 202). At least in the illustrated embodiment, the method 900 can begin by a processor 204 collecting a set of current performance data for the storage device(s) 202 (e.g., a set of storage resources) storing data (block 902).

The processor 204 further calculates multiple sets of predicted performance data for the storage resource(s) 202 (block 904). In various embodiments, the sets of predicted performance data are calculated based on implementing multiple different index combinations for the data stored on the set of storage resources, as discussed elsewhere herein.

In addition, the processor 204 predicts the optimized performance for the storage device(s) 202 (block 906). In various embodiments, the optimized performance for the storage device(s) 202 is predicted based on the multiple calculated sets of predicted performance data for the storage device(s) 202, as discussed elsewhere herein.

Further, the processor 204 identifies an optimal set of indexes in the multiple different index combinations (block 908). In various embodiments, the optimal set of indexes corresponds to the predicted optimized performance for the storage device(s) 202, as discussed elsewhere herein.

The processor 204 further selects the optimal set of indexes for implementation by the index module 304 (block 910). The processor 204 can implement the optimal set of indexes (e.g., one or more indexes (e.g., a primary index or the primary index and one or more secondary indexes) on the storage device(s) 202 (block 912).

The optimal set of indexes is implemented based on an optimized performance predicted for the storage device(s) 202, as discussed elsewhere herein. In some embodiments, the predicted optimized performance is based on the collected set of current performance data and a set of predicted performance data that identifies and/or uses the implemented set of indexes, as discussed elsewhere herein.

Figure 10:
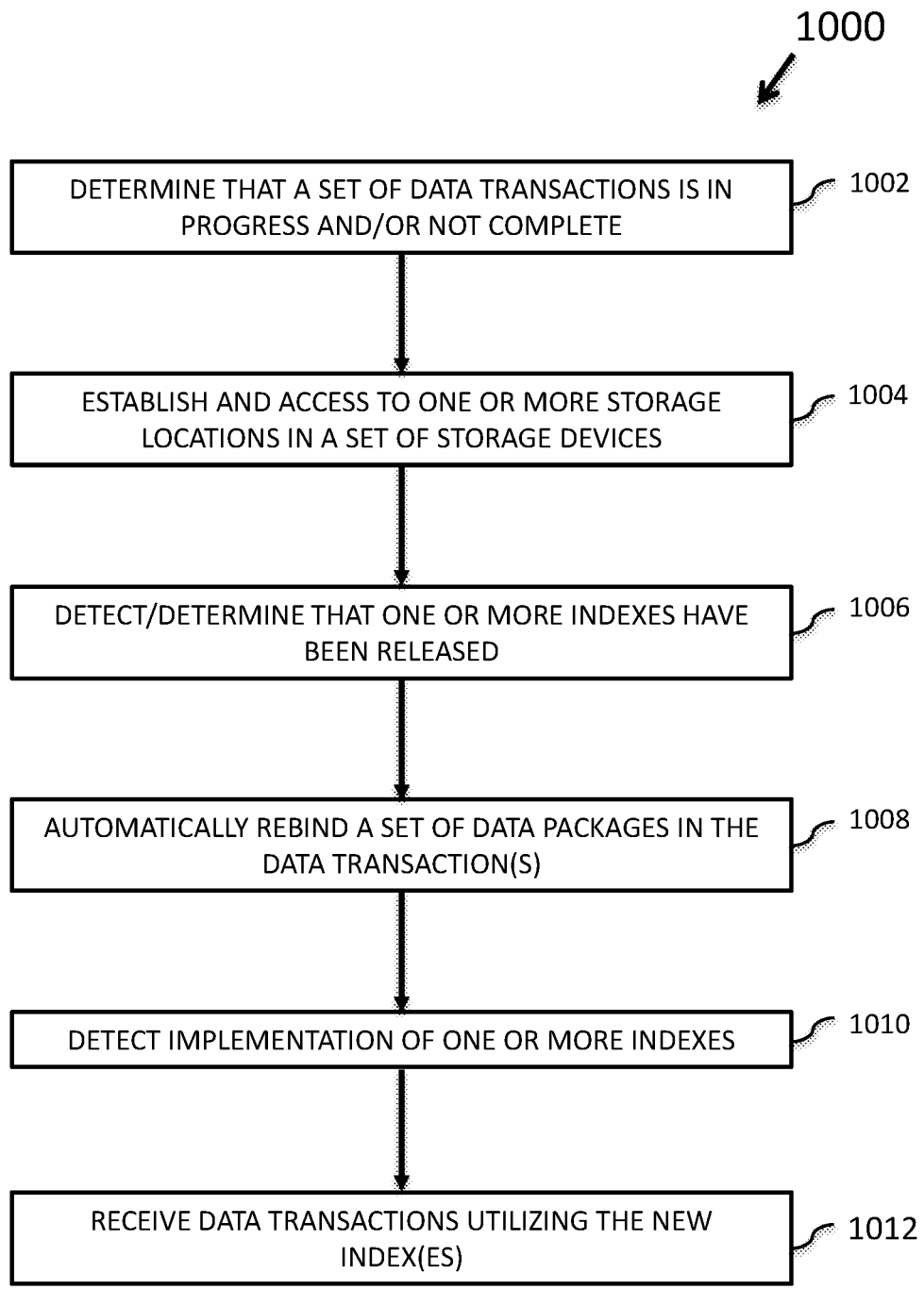
FIG. 10 is a schematic flow chart diagram illustrating one embodiment of a method 1000 for transitioning the use of a different set of indexes for a set of storage resources.

With reference to FIG. 10, FIG. 10 is a schematic flow chart diagram illustrating one embodiment of a method 1000 for transitioning the use of a different set of indexes for a set of storage resources (e.g., storage device(s) 202). That is, the method 1000 can complete data transactions and/or facilitate completing transactions that are in progress when a primary index is being replaced or the primary index and one or more secondary indexes are being replaced.

In various embodiments, the method 1000 can begin by a processor 204 determining that a set of data transactions (e.g., a query) for a set of data packages is in progress and/or is not complete at the time that a primary index is being replaced or at the time that the primary index and one or more secondary indexes are being replaced (block 1002). The processor 204 further sets and/or establishes an access path to one or more storage locations in the storage device(s) 202 in response to determining that the data transaction(s) is/are in progress and/or are not yet completed (block 1004).

Upon establishing the access path to the storage location(s) in the storage device(s) 202, the processor 204 detects and/or determines that the current primary index or the current primary index and one or more current secondary indexes has been released (block 1006). The processor 204 automatically rebinds the set of data packages after detecting/determining that the current primary index or the current primary index and one or more current secondary indexes have been released (block 1008).

The method 1000 further includes the processor 204 detecting and/or determining that a new primary index or the new current primary index and one or more new secondary indexes have been implemented (block 1010). In response to the detection/determination, the processor 204 receives and/or facilitates receiving data transactions at the storage device(s) 202 using the new primary index or the new current primary index and one or more new secondary indexes (block 1012).

Figure 11:
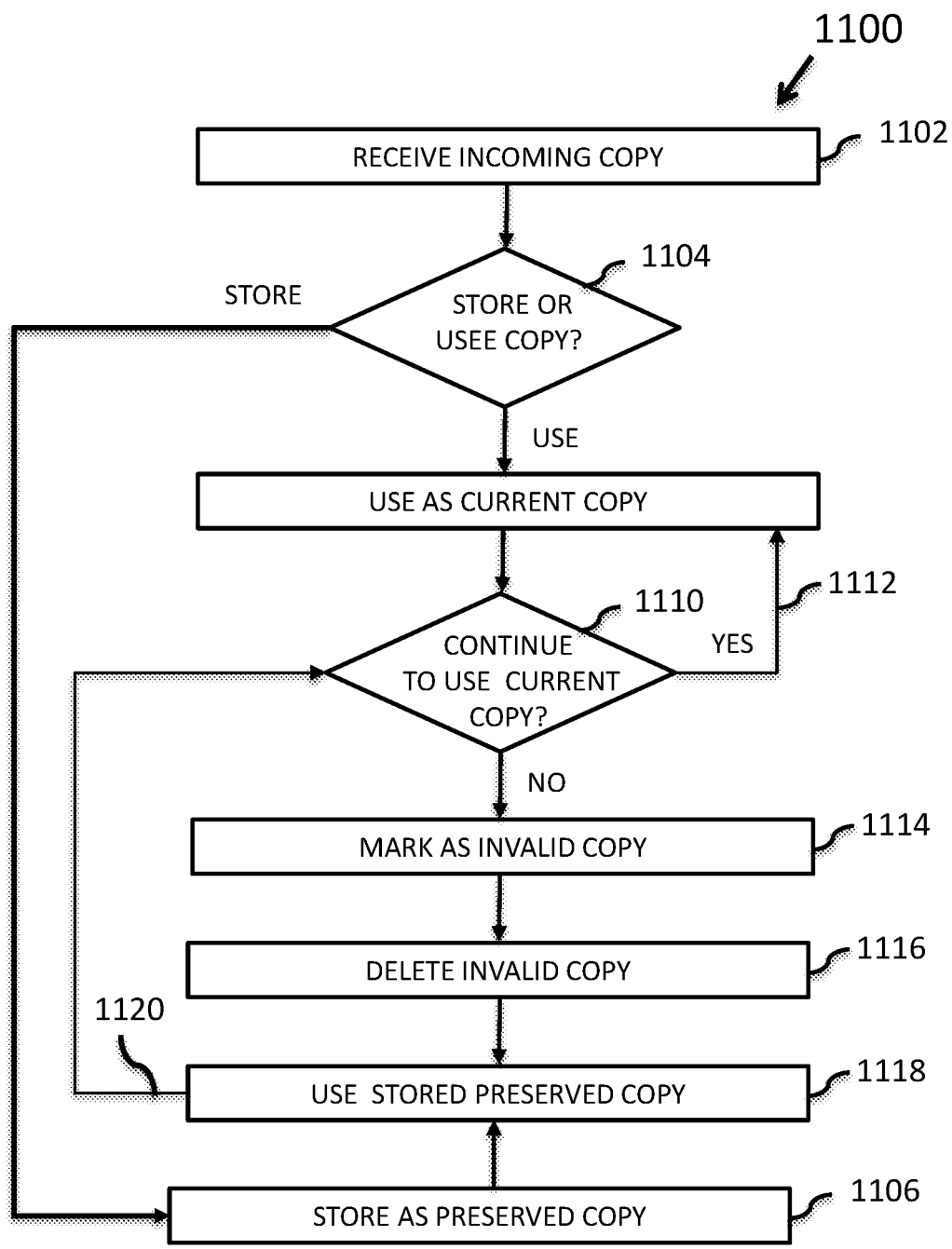
FIG. 11 is a schematic flow chart diagram illustrating one embodiment of a method 1100 for managing data and/or data packages.

Referring to FIG. 11, FIG. 11 is a schematic flow chart diagram illustrating one embodiment of a method 1100 for managing data and/or data packages. In various embodiments, the method 100 is performed in response to implementation of a set of indexes on the storage device(s) 202.

At least in the illustrated embodiment, the method 1100 begins by a processor 204 receiving a copy of a data package and/or an incoming copy (block 1102). The processor 204 selects to store the incoming copy or to use the incoming copy (block 1104).

In response to the processor 204 selecting to store the incoming copy, the processor 204 stores the incoming copy as a preserved copy of the data package (block 1106). In response to the processor 204 selecting to use the incoming copy, the processor 204 uses the incoming copy as a current copy of the data package (block 1108).

In various embodiments, the processor 204 determines whether the current copy of the data package will continue to be utilized (block 1110). In response to determining that the current copy of the data package will continued to be utilized (e.g., a "YES" in block 1110), the processor 204 continues to use the current copy of the data and the processor 204 can continue to determine whether the current copy of the data package will continue to be utilized (return 1112). In response to determining that the current copy of the data package will not continue to be utilized (e.g., a "NO" in block 1110), the processor 204 marks this current copy as an invalid copy (block 1114) and deletes the invalid copy (block 1116).

In response to the current copy being marked invalid, the processor 204 utilizes the preserved copy of the data package as a new current copy (block 1118). The method 1000 can include the processor 204 determining whether the current copy of the data package will continue to be utilized (return 1120).

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:
an information module that collects a set of current performance data for a set of storage resources storing data; and an index module that:
dynamically implements a set of indexes for the set of storage resources, wherein the set of indexes includes a current primary index and a current secondary index, and performs one of:
maintain the current secondary index in response to determining that a first index type of the current secondary index optimizes performance of the set of storage devices compared to other index types, and replace the current secondary index with a new secondary index in response to determining that a second index type of the new secondary index optimizes performance of the set of storage devices compared to the first index type of the current secondary index, wherein at least a portion of said modules comprise one or more of a set of hardware circuits, a set of programmable hardware devices, and executable code stored on a set of non-transitory computerreadable storage media.

2. The apparatus of claim 1, further comprising:
a performance module that calculates a plurality of sets of predicted performance data for the set of storage resources based on implementing a plurality of different index combinations for the data stored on the set of storage resources; and an optimization module that predicts an optimized performance for the set of storage resources based on the calculated plurality of sets of predicted performance data for the set of storage resources.

3. The apparatus of claim 2, further comprising:
an identification module that identifies an optimal set of indexes in the plurality of different index combinations that corresponds to the predicted optimized performance for the set of storage resources; and a selection module that selects the optimal set of indexes for implementation by the index module as the set of indexes.

4. The apparatus of claim 2, wherein a set of predicted performance data is calculated based on one of:
a first set of performance metrics including an execution time for locating data stored on the set storage resources using a particular index combination multiplied by an amount of storage space on the set of storage resources consumed by the particular index combination; and
a second set of performance metrics including the first set of the performance metrics further multiplied by a weighting factor based on a priority corresponding to one of:
a data type for the data stored on the set storage resources, an application that uses the data stored on the set storage resources, and an owner of the data stored on the set storage resources.

5. The apparatus of claim 1, wherein the index module is further configured to:
maintain the current primary index in response to determining that a third index type for the current primary index optimizes performance of the set of storage devices compared to the other index types.

6. The apparatus of claim 1, wherein the index module is configured to:
maintain the current secondary index in response to determining that the first index type of the current secondary index optimizes performance of the set of storage devices compared to the other index types.

7. The apparatus of claim 1, wherein the index module is configured to:
replace the current secondary index with the new secondary index in response to determining that the second index type of the new secondary index optimizes performance of the set of storage devices compared to the first index type of the current secondary index.

8. A method, comprising:
collecting, by a processor, a set of current performance data for a set of storage resources storing data; dynamically implementing a set of indexes for the set of storage resources, wherein the set of indexes includes a current primary index and a current secondary index; and performing one of:
maintaining the current secondary index in response to determining that a first index type of the current secondary index optimizes performance of the set of storage devices compared to other index types, and replacing the current secondary index with a new secondary index in response to determining that a second index type of the new secondary index optimizes performance of the set of storage devices compared to the first index type of the current secondary index.

9. The method of claim 8, further comprising:
calculating a plurality of sets of predicted performance data for the set of storage resources based on implementing a plurality of different index combinations for the data stored on the set of storage resources;
and predicting the optimized performance for the set of storage resources based on the calculated plurality of sets of predicted performance data for the set of storage resources.

10. The method of claim 9, further comprising:
identifying an optimal set of indexes in the plurality of different index combinations that corresponds to the predicted optimized performance for the set of storage resources; and selecting the optimal set of indexes for implementation by the index module as the set of indexes.

11. The method of claim 9, wherein calculating a set of predicted performance data comprises one of:
multiplying an execution time for locating data stored on the set storage resources using a particular index combination multiplied by an amount of storage space on the set of storage resources consumed by the particular index combination to generate a first set of performance metrics; and further multiplying the first set of the performance metrics by a weighting factor based on a priority to generate a second set of performance metrics, wherein the priority corresponds to one of:
a data type for the data stored on the set storage resources, an application that uses the data stored on the set storage resources, and an owner of the data stored on the set storage resources.

12. The method of claim 8, wherein dynamically implementing the set of indexes comprises:
maintaining the current primary index in response to determining that a third index type for the current primary index optimizes performance of the set of storage devices compared to the other index types.

13. The method of claim 8, wherein performing the one of the maintaining and the replacing comprises:
maintaining the current secondary index in response to determining that the first index type of the current secondary index optimizes performance of the set of storage devices compared to the other index types.

14. The method of claim 8, wherein performing the one of the maintaining and the replacing comprises:
replacing the current secondary index with the new secondary index in response to determining that the second index type of the new secondary index optimizes performance of the set of storage devices compared to the first index type of the current secondary index.

15. A computer program product for managing a set of indexes for a set of storage resources, the computer program product comprising a computer-readable storage medium including program instructions embodied therewith, the program instructions executable by a processor to cause the processor to:

collect a set of current performance data for a set of storage resources storing data; dynamically implement a set of indexes for the set of storage resources, wherein the set of indexes includes a current primary index and a current secondary index; and perform one of:

maintain the current secondary index in response to determining that a first index type of the current secondary index optimizes performance of the set of storage devices compared to other index types, and replace the current secondary index with a new secondary index in response to determining that a second index type of the new secondary index optimizes performance of the set of storage devices compared to the first index type of the current secondary index.

16. The computer program product of claim 15, wherein the program instructions further cause the processor to:

calculate a plurality of sets of predicted performance data for the set of storage resources based on implementing a plurality of different index combinations for the data stored on the set of storage resources; and predict the optimized performance for the set of storage resources based on the calculated plurality of sets of predicted performance data for the set of storage resources.

17. The computer program product of claim 16, wherein the program instructions further cause the processor to:

identify an optimal set of indexes in the plurality of different index combinations that corresponds to the predicted optimized performance for the set of storage resources; and select the optimal set of indexes for implementation by the index module as the set of indexes.

18. The computer program product of claim 16, wherein the program instructions further cause the processor to one of:

multiply, by the processor, an execution time for locating data stored on the set storage resources using a particular index combination multiplied by an amount of storage space on the set of storage resources consumed by the particular index combination to generate a first set of performance metrics; and further multiply, by the processor, the first set of the performance metrics by a weighting factor based on a priority to generate a second set of performance metrics, wherein the priority corresponds to one of:

a data type for the data stored on the set storage resources, an application that uses the data stored on the set storage resources, and an owner of the data stored on the set storage resources.

19. The computer program product of claim 15, wherein the program instructions that cause the processor to perform the one of the maintain and the replace cause the processor to:

maintain the current secondary index in response to determining that the first index type of the current secondary index optimizes performance of the set of storage devices compared to the other index types.

20. The computer program product of claim 15, wherein the program instructions that cause the processor to perform the one of the maintain and the replace cause the processor to:

replace the current secondary index with the new secondary index in response to determining that the second index type of the new secondary index optimizes performance of the set of storage devices compared to the first index type of the current secondary index.

* * * * *